United States Patent
Letas (10) Patent No.: US 10,879,783 B2
(45) Date of Patent: Dec. 29, 2020

(54) WIND TURBINE HAVING LOW-HARMONIC CONVERTER SYSTEM, AND METHOD FOR OPERATION

(71) Applicant: SENVION GmbH, Hamburg (DE)

(72) Inventor: Heinz-Hermann Letas, Bovenau (DE)

(73) Assignee: SENVION GmbH, Hamburg (DE)

( * ) Notice: Subject to any disclaimer, the term of this patent is extended or adjusted under 35 U.S.C. 154(b) by 87 days.

(21) Appl. No.: 16/139,856

(22) Filed: Sep. 24, 2018

(65) Prior Publication Data

US 2019/0097520 A1 Mar. 28, 2019

(30) Foreign Application Priority Data

Sep. 25, 2017 (DE) .......................... 10 2017 008 936

(51) Int. Cl.
| | |
|---|---|
| *H02M 1/12* | (2006.01) |
| *F03D 7/02* | (2006.01) |
| *F03D 7/04* | (2006.01) |
| *H02J 3/38* | (2006.01) |
| *H02M 1/42* | (2007.01) |

(Continued)

(52) U.S. Cl.
CPC ............ *H02M 1/12* (2013.01); *F03D 7/0284* (2013.01); *F03D 7/048* (2013.01); *H02J 3/01* (2013.01); *H02J 3/14* (2013.01); *H02J 3/34* (2013.01); *H02J 3/386* (2013.01); *H02J 3/44* (2013.01);

(Continued)

(58) Field of Classification Search
CPC .... H02M 1/12; H02M 1/4233; H02M 7/5387; H02M 1/42; F03D 7/0284; F03D 7/048; F03D 7/02; F03D 7/04; H02J 3/01; H02J 3/14; H02J 3/34; H02J 3/386; H02J 3/44; H02J 3/38

See application file for complete search history.

(56) References Cited

U.S. PATENT DOCUMENTS

| 7,724,548 B2 | 5/2010 | Jones et al. |
| 2010/0090775 A1 | 4/2010 | Huda et al. |

(Continued)

FOREIGN PATENT DOCUMENTS

| CN | 101141068 A | 3/2008 |
| DE | 102006006960 | 8/2007 |

(Continued)

OTHER PUBLICATIONS

Mohan et al. (2003). "Switch-Mode dc-ac Inverters: dc <-> Sinusoidal ac" Chapter 8 in Power Electronics: Converters, Applications, and Design. John Wiley & Sons, Inc., pp. 202-211.

(Continued)

*Primary Examiner* — Robert L Deberadinis
(74) *Attorney, Agent, or Firm* — Morrison & Foerster LLP (57) ABSTRACT

A converter controller is provided, by which the current valves are controlled by means of a switching frequency. It is provided to alter the switching frequency in a step-wise manner between a first and at least one second integral multiple of the grid frequency. According to the invention, this is effected in that the switching frequency is switched over cyclically, and a frequency spacing between the switching frequencies is at least double the grid frequency, specifically in such a manner that none of the switching frequencies is an integral multiple of another of the switching frequencies. In this way, harmonics can be selectively (Continued)

reduced, no intermediate frequencies being produced, owing to the integrality in relation to the grid frequency.

21 Claims, 6 Drawing Sheets

(51) Int. Cl.
*H02M 7/5387* (2007.01)
*H02J 3/01* (2006.01)
*H02J 3/14* (2006.01)
*H02J 3/34* (2006.01)
*H02J 3/44* (2006.01)

(52) U.S. Cl.
CPC ....... *H02M 1/4233* (2013.01); *H02M 7/5387* (2013.01)

(56) References Cited

U.S. PATENT DOCUMENTS

| | | |
|---|---|---|
| 2013/0200828 A1 | 8/2013 | Miller et al. |
| 2017/0294852 A1 | 10/2017 | Correa Vasques et al. |

FOREIGN PATENT DOCUMENTS

| | | |
|---|---|---|
| DE | 102014119502 | 3/2016 |
| EP | 2793392 | 10/2014 |
| WO | 2017/129766 | 8/2017 |

OTHER PUBLICATIONS

Search Report dated Feb. 15, 2019, directed to EP Application No. 18196391.9; 11 pages.

First Office Action dated Apr. 29, 2020, directed to Chinese Application No. 201811106611.9; 20 pages.

WIND TURBINE HAVING LOW-HARMONIC CONVERTER SYSTEM, AND METHOD FOR OPERATION

CROSS-REFERENCE TO RELATED APPLICATIONS

This application claims the priority of German Application No. 10 2017 008 936.1, filed Sep. 25, 2017, the entire contents of which are incorporated herein by reference.

FIELD OF THE INVENTION

The invention relates to a wind turbine, and to a method for operating a wind turbine having a generator, and to a converter for generating electrical power and delivering it at a grid frequency.

BACKGROUND OF THE INVENTION

To enable operation with variable rotational speed, modern wind turbines are provided with converters. The converter in this case typically consists of two inverters having a voltage link, one of the inverters being arranged on the generator side and the other on the grid side. Inverter having square-wave voltage pulses, of variable pulse width, generated by modulation. This pulsed voltage, besides generating the required fundamental mode of the voltage (grid frequency), also generates voltage harmonics at the output of the inverter. These harmonics disturb the grid, and are therefore unwanted. Therefore, for the purpose of damping the voltage, filters, which are usually realized as L-C filters or L-C-L filters, are typically provided on the grid connection side. These filters reduce the voltage harmonics over a wide band. A selective reduction of particularly disturbing harmonics requires specially optimized, additional filters. The latter are not only very expensive, but also require elaborate configuration. Owing to the impedance present in the grid (in particular transformer impedance and grid impedance), the voltage harmonics that are thus not fully eliminated become harmonic currents in the grid. These harmonic currents load the grid, and are therefore unwanted. In respect of this, to secure the stability of the grid, there are predefined limit values. Fulfilling the latter, particularly in the case of so-called soft grids, is extremely demanding.

The reduction of harmonics by additional L-C-L filters, known per se, is too demanding of resources for general application, and moreover is not sufficiently specific to eliminate particularly disturbing harmonics.

For converters of wind turbines, it is known to adjust the switching frequency in steps, the switching frequencies used being integral multiples of each other. For example, if the fundamental switching frequency per se is 2.25 kHz, then conversion to 4.5 kHz, 6.75 kHz, 9 kHz, etc. can be effected. Since the higher switching frequencies are integral multiples of the fundamental switching frequencies, they load the harmonic spectrum of the fundamental switching frequency. Moreover, the multiplication of the switching frequency can cause an adverse increase in the switchover losses.

From a different context, with the use of solar modules, it is known (DE 10 2014 119 502 B3) to connect a plurality of converters in parallel. In this case, the auxiliary signals used for pulse-width modulation of the converters must be synchronized. It is additionally provided to wobble these pulse-width modulation signals, in order thus to distribute the electromagnetic radiation to a broader spectrum.

SUMMARY OF THE INVENTION

Aspects of the invention are based on the object of providing a wind turbine, and a method for operation thereof, by which the disturbing harmonics can be reduced more selectively.

According to some embodiments of the invention, a method for operating a wind turbine having a generator, which is driven by a wind rotor and which acts in combination with a converter to generate electrical power that is delivered at grid frequency via a connection line, the converter comprising at least one grid-side inverter having current valves, and a converter controller being provided for controlling the converter, the current valves being controlled by a control signal by means of a switching frequency, includes an altering of the switching frequency in a stepwise manner between a first and at least one second integral multiple of the grid frequency, the switching frequency being switched over cyclically, and a frequency spacing between the switching frequencies being at least double the grid frequency, and none of the switching frequencies being an integral multiple of another of the switching frequencies.

Firstly, an explanation of some terms used:

A switching frequency is understood to mean the frequency of the control signal by which the current valves of an inverter are controlled.

A periodicity is understood to mean the period duration of a cycle.

A grid frequency is understood to mean the frequency at which the wind turbine delivers the electrical power into the grid.

A duty time, within a cycle, is understood to mean the time period during which a particular switching state prevails. The duty time corresponds to the ratio of the duty factor and period duration of the cycle.

Aspects of the invention are based on the concept that differing harmonics can be generated in dependence on the choice of switching frequency. The harmonics can be controlled selectively by cyclic switchover. Thus, the harmonics belonging to a switching frequency can be reduced in that, within a cycle, this switching frequency is set less frequently. In this case, according to the invention, the switching frequencies are integral multiples of the fundamental frequency (grid frequency). However, in this case none of the switching frequencies is an integral multiple of one of the other switching frequencies. This is because the harmonic spectrum would then for the most part overlap, which would be counter-productive for the purposes of aspects of the present invention.

In this way, disturbing harmonics can be selectively reduced, in that the converters are operated more frequently (i.e. with greater time proportions) at a different switching frequency, the different switching frequency likewise being an integral multiple and differing at least by double the fundamental frequency. Owing to the integrality, these conditions do not produce any intermediate frequencies. This is important, since intermediate frequencies entail the considerable risk of disturbing ripple control systems in the grid. The choice of double the fundamental frequency as a minimum in the frequency change offers the advantage that the nature of integrality is maintained: if the first switching frequency is an odd-number multiple, then so is the second switching frequency. The switching over of the switching frequency is then less liable to fault than would be the case with switching over to even-number multiples.

Overall, aspects of the invention thus makes it possible to selectively reduce harmonics without elaborate and specially optimized filters being required for this purpose. Only a small amount of additional resource, or no additional resource, in respect of hardware, is required since the necessary alteration of the switching frequency can mostly be performed easily with existing means. Additional switching losses do not occur, at least not if the weighted mean value of the switching frequencies remains as previously (i.e. as without the invention). Aspects of the invention additionally offer the advantage of simple adaptability, since an adaptation does not necessitate any hardware changes. This also relates, in particular, to the adaptation of the wind turbines for operation on the 50 Hz or 60 Hz grid; it was precisely this that, previously, could only be realized with elaborate adaptations and changes by means of conventional filters.

No special requirements in respect of the converter are imposed, according to some embodiments. Simple "2-level" versions may be used, as well as more elaborate "multi-level" versions. The invention substantially concerns the grid-side inverter. The effects according to the invention are achieved by altering the switching frequency of the flow valves of the grid-side inverter. The rest of the elements of the converter (such as generator-side inverter/rectifier or link circuit) can remain unchanged.

It has proved particularly successful to use exclusively odd-number integral multiples of the fundamental frequency for the switching frequency. An effective reduction of particularly disturbing harmonics can thereby be achieved.

Advantageously, the period duration of a cycle is less than 200 ms. This means that the switchover of the switching frequency occurs more frequently than five times per second, i.e. at more than 5 Hz. Since the technically used switching frequencies are mostly in the range of acoustically audible frequency, it has been found that environmentally disturbing noise impressions (for example, vibrato) can be avoided if the switchover occurs with sufficient rapidity. With sufficient rapidity in this case means that the period duration of a cycle is shorter than 200 ms, preferably maximally 160 ms. The differing switching frequencies are then no longer acoustically perceived in the environment as individual frequencies, but blend together to form one overall impression.

Basically, the use of two differing switching frequencies is sufficient for execution of the invention, according to some embodiments. However, a more selective and more comprehensive influencing of the harmonics can be effected if a third switching frequency, or even yet further switching frequencies, are used. A particularly free adaptation of the harmonic spectrum can thereby be effected. The third, or further, switching frequencies are preferably likewise (odd-number) integral multiples of the switching frequency.

The switchover of the switching frequencies may be effected uniformly, in the sense that during a cycle each switching frequency is set to be of the same length as the others. From a technical viewpoint, this means that the duty factor of the switching frequencies is the same. This means that, for example in the case of two differing switching frequencies, each of the two switching frequencies is set for 50% of the cycle time; and in the case of three switching frequencies, each of the three switching frequencies is set for 33.3% of the cycle time. However, this is not an absolute necessity. It may also be provided that the switching frequencies are set so as to differ in length. By this means, the magnitude of the reduction of the respective harmonics can be controlled in an optional manner. It is the case that, the shorter the relative time proportion for a switching frequency, the greater is the reduction in the measurement value of the respective harmonic. According to the invention, therefore, a selective redistribution of harmonic amplitudes can be effected by selection of the time distribution. It has proved successful in this case to vary the duty times, not steplessly, but within a raster.

Expediently, the switchover of the switching frequency is effected in phase synchronicity. Expediently, this is effected such that a switching frequency always remains set for several periods. In this way, the occurrence of disturbing phase-dependent effects is reliably avoided. The switchover is advantageously effected in each case at the maximum amount of the carrier signal. This is a relatively easily detected event, and thereby expediently ensures the desired synchronization.

Advantageously, at least one second converter is provided, which is arranged in parallel. It is controlled, exactly as described above, with cyclically switched-over switching frequencies, i.e. with the same switching frequency but with an offset phase. In the case of a total of two converters, the phase offset is preferably 180°; in the case of a greater number, of n, converters, accordingly 360° divided by the number n. An even better extinction is thereby achieved in respect of the harmonics. In this case the second (and possibly the further) converters is (are) connected via their own lines to the generator, such that the converters are isolated from each other. Combination is effected only on the grid side, preferably via a three-winding transformer (with respectively grounded neutral points). The invention also extends to a wind turbine configured for the corresponding operation, having a corresponding switchover means for the switching frequency of the control signal. For more detailed explanation, reference is made to the description that follows.

BRIEF DESCRIPTION OF THE DRAWINGS

The invention is described in greater detail in the following with reference to the appended drawing, on the basis of an exemplary embodiment. There are shown.

DETAILED DESCRIPTION OF THE INVENTION

Figure 1:
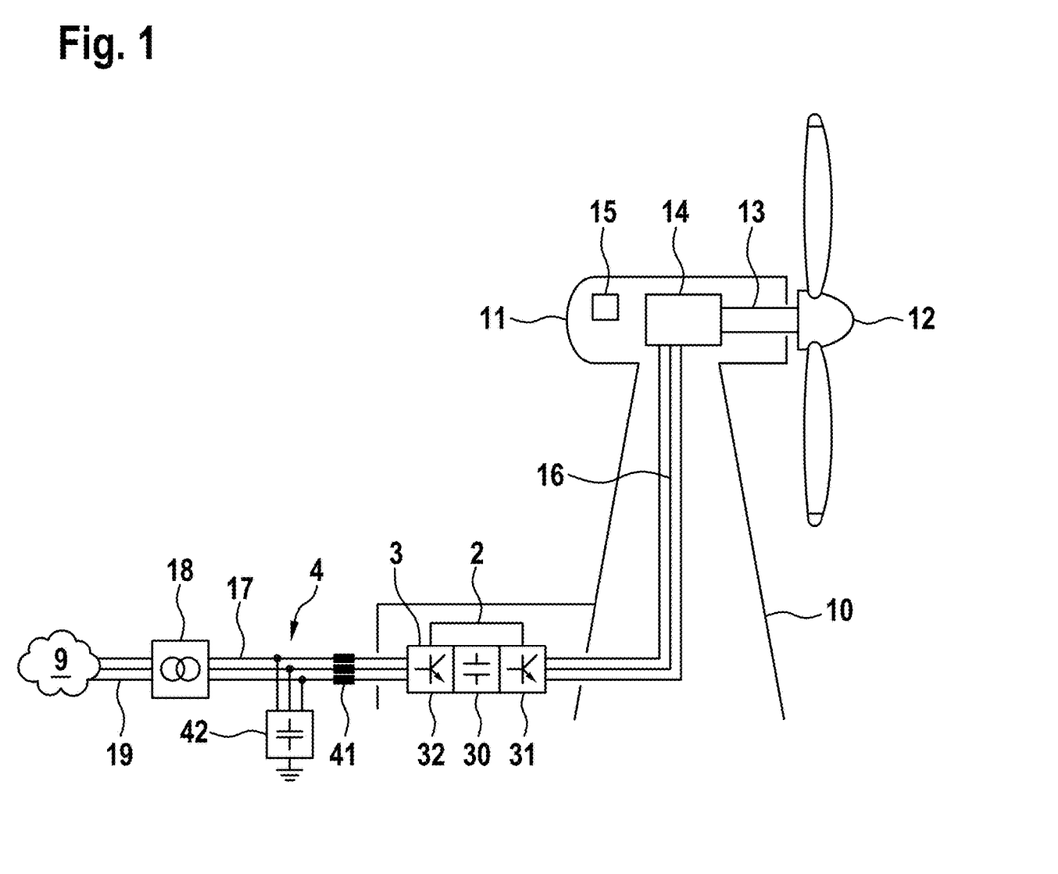
FIG. 1 shows a schematic view of a wind turbine, having a converter according to an exemplary embodiment of the invention.

For the purpose of explaining an exemplary embodiment of the invention, reference is first made to FIG. 1. It shows a wind turbine according to an exemplary embodiment of the invention, denoted in its entirely by the reference 1, that is suitable for executing the method according to the invention.

The wind turbine 1 comprises a tower 10, arranged at the upper end of which, so as to be slewable in the azimuthal direction, is a nacelle 11. Rotatably arranged on an end face of the nacelle 11 is a wind rotor 12. It comprises a hub having one or more rotor blades and, via a rotor shaft 13, drives a generator 14 arranged in the nacelle 11. This generator converts the mechanical power, generated from the wind by the wind rotor 12, into electrical power. The generator 14 may be a synchronous or asynchronous generator, but other generator designs may also be provided. Also arranged in the nacelle 11 is an operation controller 15 that controls the overall operation of the wind turbine 1.

Also provided is a converter 3, which in the case of the exemplary embodiment represented is arranged at the foot of the tower 10 of the wind turbine 1. It is connected to the generator 14 via a connecting line 16 that extends through the entire tower 10. The converter 3 comprises a rectifier or generator-side inverter 31, a grid-side inverter 32 and, arranged between them, a direct-voltage link circuit 30. The converter 3 delivers electrical power, via a line 17, to a system transformer 18. The latter, in turn, is connected to a grid 9 via a connection line 19, and delivers electrical power to the grid 9.

An L-C-L filter 4, for reducing the harmonics produced by the grid-side inverter 32, is provided in the line 17. The L-C-L filter 4 is composed of a grid filter choke 41 at the output of the grid-side inverter 32, a capacitor 42 that is arranged on the grid side of the grid filter choke 41 and connected to ground, and a second inductor, connected in series. For reasons of complexity, the latter is not realized as a separate structural element, but instead the winding of the system transformer 18 on the wind turbine side functions as a second inductor of the L-C-L filter 4.

Figure 2:
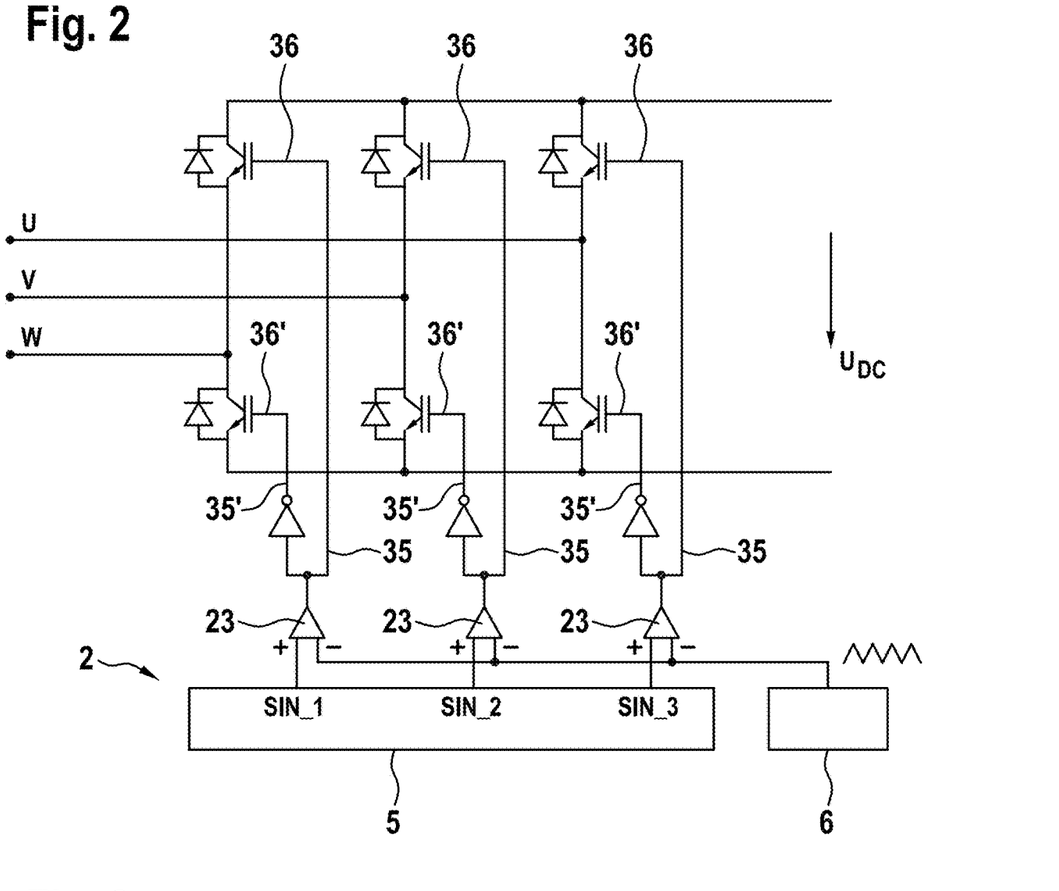
FIG. 2 shows a partial circuit diagram of the converter with its control system.

The functional structure of the grid-side inverter 32 is represented in greater detail in FIG. 2. It has three parallel phase strands, which each respectively comprise two series-connected current valves 36, 36'. One of the phases of the line 17 is in each case connected to the common node point of each two series-connected current valves 36, 36'. This applies to a two-level converter, which is represented in FIG. 2 for reasons of simplification. However, the invention is not limited thereto. The converters 3, or the grid-side inverter 32, may also be realized (in a manner known per se) with more than two levels (so-called multi-level converter).

The current valves 36, 36' are controlled by a converter controller 2, via signal lines 35, 35'. For the purpose of generating control signals, the converter controller 2 comprises a pulse-width modulator, having a closed-loop controller 5 that controls the sinusoidal oscillation to be delivered by the inverter 32, and a carrier-signal generator 6. For each of the three phases, the closed-loop controller generates a respective sinusoidal switching frequency (SIN_1, SIN_2, SIN_3), which are each offset in phase by 120° in relation to each other. Frequency and amplitude are dependent on a control signal generated by the operation controller 15 for the inverter 32. For the purpose of further processing by simple digital means, the thus generated same-frequency, but phase-offset, signals are each fed to a sample-and-hold element (not represented), and the signals then obtained as a result of the sampling are output from the closed-loop controller 5. They are each respectively applied to a positive input of a comparator 23. Connected to a negative input of each comparator 23 is a carrier signal that is prepared by the carrier-signal generator 6. The output of the comparator 23 is connected, via the signal line 35, to respectively one of the upper current valves 36, and in addition the output is connected, via respectively one interposed inverter 24 and the signal line 35', to respectively one of the lower current valves 36'. The lower current valves 36' are thus controlled in complement to the upper control valves 36. The above explanation is given exemplarily for a converter having pulse-width modulation that is operated according to the subharmonic method; however, the invention is not limited to this design, but may also be provided in the case of other converter designs.

Figure 3:
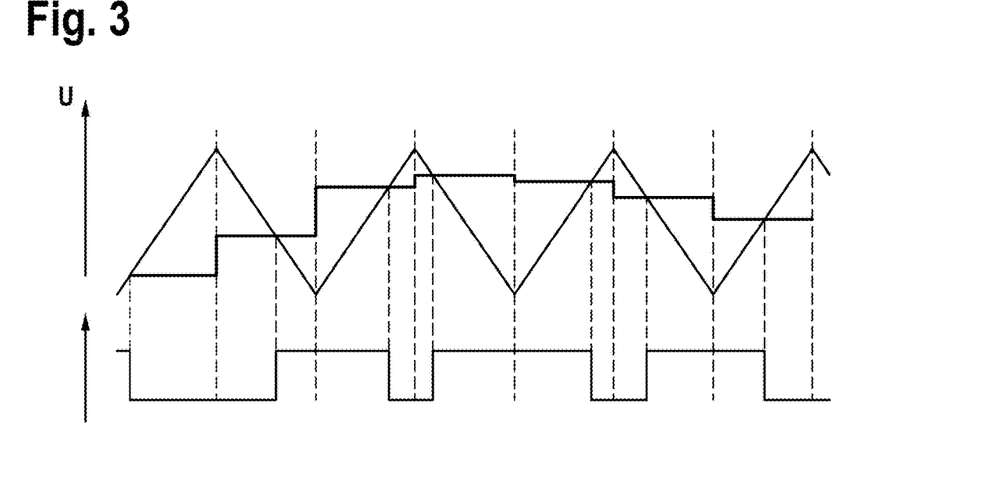
FIG. 3 shows diagrams relating to signals of the pulse-width modulation.

Overall, the comparator 23 in this case functions as a modulation stage, which modulates the carrier signal, generated by the carrier-signal generator 6, according to the sinusoidal signal sampled by the closed-loop controller 5. The respective current valves 36, 36' are thus controlled for a shorter or longer period, depending on the currently existing amplitude of the sinusoidal signal, specifically with the frequency of the carrier signal. This is the basic principle of pulse-width modulation, as visualized in FIG. 3. The input signals of the modulation stage (comparator 23) are represented at the top of the diagram. On the one hand, this is the triangular carrier signal, and on the other hand this is the sampled (and thus block-type rising and falling) control voltage of the closed-loop controller 5, which corresponds approximately to a half-wave of a sinusoidal signal. The sampling in this case is synchronized with the carrier signal such that a new sampling is in each case effected upon an extreme value of the carrier signal (maximum or minimum). The signal resulting at the output of the modulation state is thus pulse-width-modulated (PWM signal), and represented at the bottom in FIG. 3. It can be seen that, the higher the control voltage, the greater is the duty factor of the output signal.

Usually, the frequency of the carrier signal is in the audible spectrum, of some kilohertz. This results in the inverter emitting a characteristic whistling sound. The pitch of the whistling sound in this case is determined by the frequency of the carrier signal, and the loudness is determined by the duty factor.

According to the invention, it is provided that the frequency of the carrier signal does not remain constant, but is switched over between two values, which are both odd-number integral multiples of the fundamental frequency (grid frequency). In the case of a grid frequency of 50 Hz, if multiples of 39 and 41 are assumed, as an example, switching frequencies of the carrier signal of 1950 and 2050 Hz respectively are obtained. There are two important aspects in this case: on the one hand, each of the switching frequencies is to be an integral multiple, preferably an odd number, and on the other hand the spacing of the frequencies between which switchover is effected is to be at least double the grid frequency. This is visualized in FIG. 4.

Figure 4:
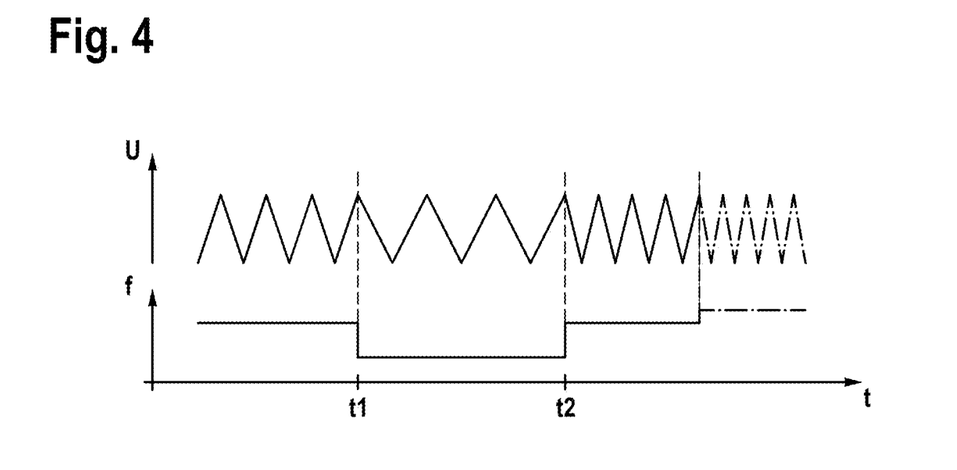
FIG. 4 shows diagrams relating to the control of the converter with switchovers between switching frequencies.

Represented in FIG. 4 is the time characteristic of the switching frequency of the carrier signal, specifically with amplitude represented at the top and frequency represented at the bottom. Firstly (on the left in FIG. 4), a first switching frequency is output. At the instant t1 a switchover is effected to a second, lower, switching frequency. The switchover is effected in synchronism with a maximum of the triangular switching frequency, such that a seamless succession is obtained. At the instant t2 switch-back is effected to the first switching frequency. Optionally—depending on the embodiment—a switchover to a third switching frequency may be provided, as represented by a dot-dash line on the extreme right in FIG. 4. The third switching frequency is higher than the first switching frequency. The switchover is always effected in synchronism, namely in the maximum of the triangular switching frequency.

Figure 5:
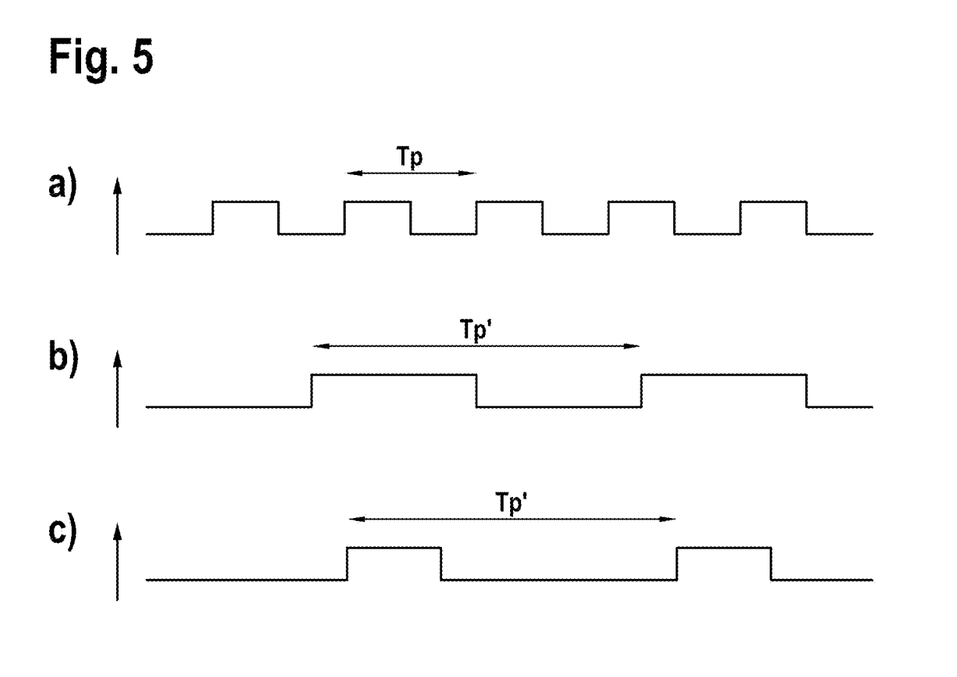
FIGS. 5A-C show differing time characteristics relating to the switchover of the switching frequency in the case of two switching frequencies.

Represented in FIGS. 5a to c are examples for the time distribution of two differing switching frequencies. The same frequency representation is used as that in the lower region of FIG. 4. In FIG. 5a, the two switching frequencies are distributed symmetrically, i.e. both are selected for 50% of the time in each case. In this case, the switchover follows relatively rapidly, i.e. the shortest period duration (Tp) for the switchover. As an alternative to this, FIG. 5b shows a characteristic in which, likewise, the two switching frequencies are distributed symmetrically, but a significantly longer period duration (Tp') is set for the switchover. What is represented is in fact the longest possible period duration provided within the scope of the invention, namely 160 ms. A switchover frequency of a good 6 Hz is thereby obtained. The invention has identified that a switchover frequency of at least 6 Hz has the advantage that a uniform acoustic impression is produced, and an environmentally unpleasant "vibrato", such as that which would occur in the case of lower-frequency switchover, can thus be avoided. A change between two switching frequencies with a longest possible period duration (Tp') is likewise represented in FIG. 5c, but with the difference that there is an asymmetrical distribution between the two switching frequencies: the higher switching frequency is set significantly less often that the lower.

This altering of the distribution is also referred to as setting the duty factor. It can be used according to the invention to influence the level of occurrence of those harmonics that are linked to the respective switching frequency. Thus, in the case of FIG. 5c, the harmonics associated with the occurrence of the higher switching frequency are reduced, whereas in the case of FIG. 5b the harmonics occurring with the occurrence of the lower switching frequency are reduced. Thus, "designing" of the harmonic output can be effected by altering the duty factor. If, for example, the harmonics caused by the higher switching frequency are critical and result in non-compliance with grid connection criteria, then the proportion of the higher switching frequency can be reduced, by changing to the asymmetrical distribution according to FIG. 5c with the other duty cycle, whereby the harmonics linked to the higher switching frequency are also reduced accordingly. Compliance with the required limit values is thereby simplified considerably.

Figure 6:
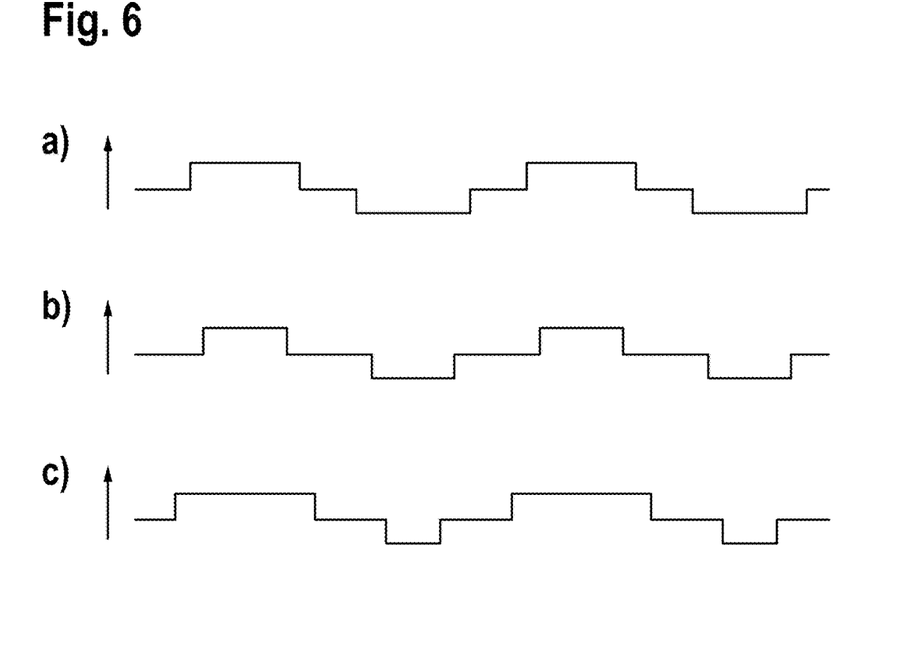
FIGS. 6A-C show differing time characteristics relating to the switchover of the switching frequency in the case of three switching frequencies.

Examples for the time distribution of three differing switching frequencies are represented in FIGS. 6a to c. The same representation is used as in FIG. 5. Thus, represented in FIG. 6a is a symmetrical distribution, in which each switching frequency is set for one third of the time. Represented in FIG. 6b is a variant in which the durations for the individual switching frequencies differ. In this case, the middle frequency is used for twice as long as the low or the high frequency. An asymmetrical distribution is represented in FIG. 6c. In this case, the high and the middle switching frequencies are each set for 40% of the time, and the low frequency is set for 20% of the time.

Figure 7:
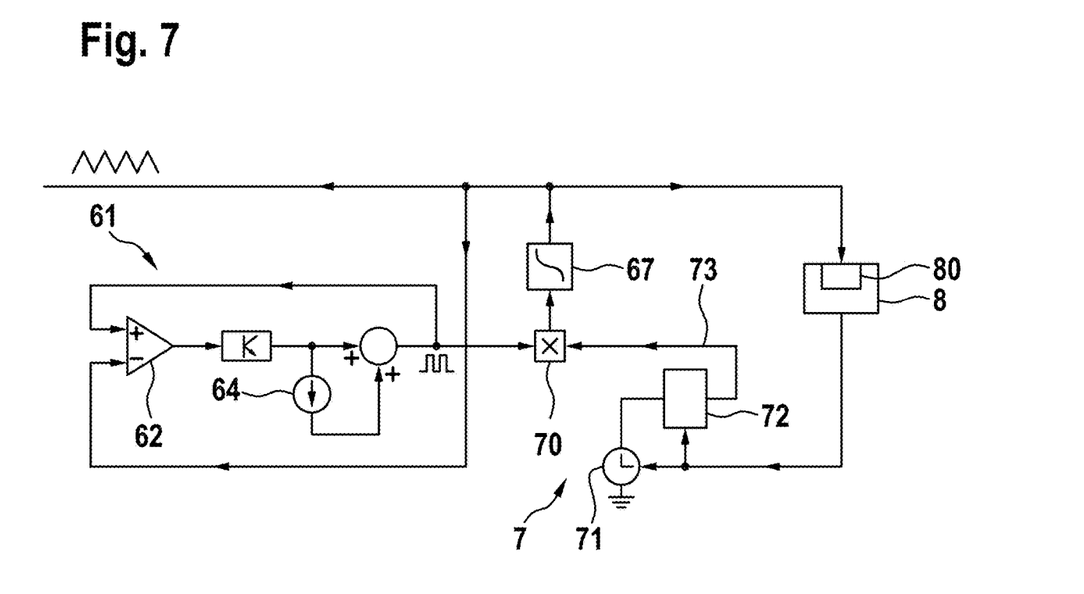
FIG. 7 shows a block diagram for a means of switching over the switching frequency.

A block diagram for a carrier-signal generator 6, realized according to the invention, for switching over the switching frequency is represented in FIG. 7. It comprises a trigger circuit 61 for forming a square-wave signal, which in known manner is composed of a positive-feedback operational amplifier 62 and a voltage reference 64. The carrier-signal generator 6 additionally comprises, following the trigger circuit 25, an integrator stage 67 for forming a triangular signal. The output of the trigger circuit 61 is not applied directly to the input of the integrator stage 67, however, but is routed via an interposed multiplication element 70. It is part of a switchover means 7.

The switchover means 7 comprises a value sequence table 72, in which values for the switching frequency to be set are stored in time sequence. For example, if three differing switching frequencies are to be set, the value sequence contains 72 values for these three switching frequencies, specifically in the sequence in which they are to be used; this sequence can of course vary, for example in the sequence low-middle-high and then the reverse sequence high-middle-low. Other variations are possible and, owing to the selected implementation with the value sequence table 72, can be used without difficulty. The time period over which a switching frequency is set before switchover is effected to a different switching frequency is also stored in the value sequence table 72. This applies correspondingly to other numbers of switching frequencies, for example two or four and more.

The value sequence table 72 is connected to a clock pulse generator 71. The latter determines over the time points when new values are fetched from the value sequence table 72. The fetched values are output as switching-frequency control signals and applied, via a signal line 73, to a second input of the multiplication element 70. In this way, the frequency of the carrier signal emitted by the carrier-signal generator 6 is altered for the pulse-width modulation.

A synchronization means 8 is additionally provided. It includes a maximum detector 80, and acts in combination with the clock pulse generator 71. This is effected in that enabling for switchover is effected only upon identification of a maximum in the triangular signal emitted by the carrier-signal generator 6. For this purpose, corresponding enabling signals are applied to the clock pulse generator 71 and to the value sequence table unit 72, via an enabling line 81. It is thereby achieved that the switchover of the switching frequency by the switchover means 7 is effected only when the triangular signal of the switching frequency has a maximum value, i.e. to that extent is phase-synchronized.

Figure 8:
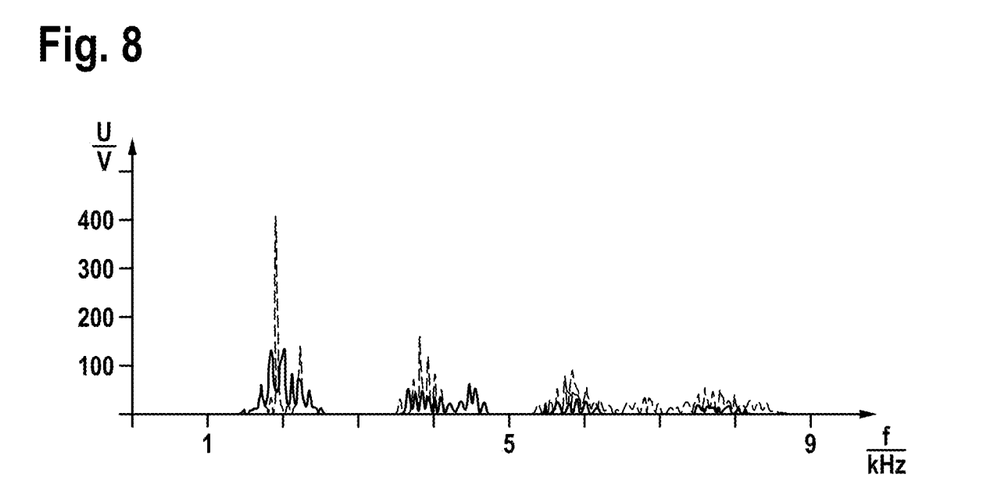
FIG. 8 shows a harmonic spectrum for three switching frequencies.

The effect of the switchover of the switching frequencies according to the invention upon the harmonic spectrum is represented in FIG. 8, specifically taking the example of a switchover means that switches over between three switching frequencies (1850 Hz, 2050 Hz and 2250 Hz, of equal length in each case, period duration 120 ms). The first, second and third harmonics are in the range of 4000, 6000 and 8000 Hz. It is clearly evident that all harmonics still occur only with very low magnitude. For comparison, the harmonic spectrum according to the prior art, without a switchover means, is represented by a broken line. The difference is striking and significant. Thus, according to the invention, the harmonic load can be reduced significantly, without the need for additional elaborate filters for this purpose.

Figure 9:
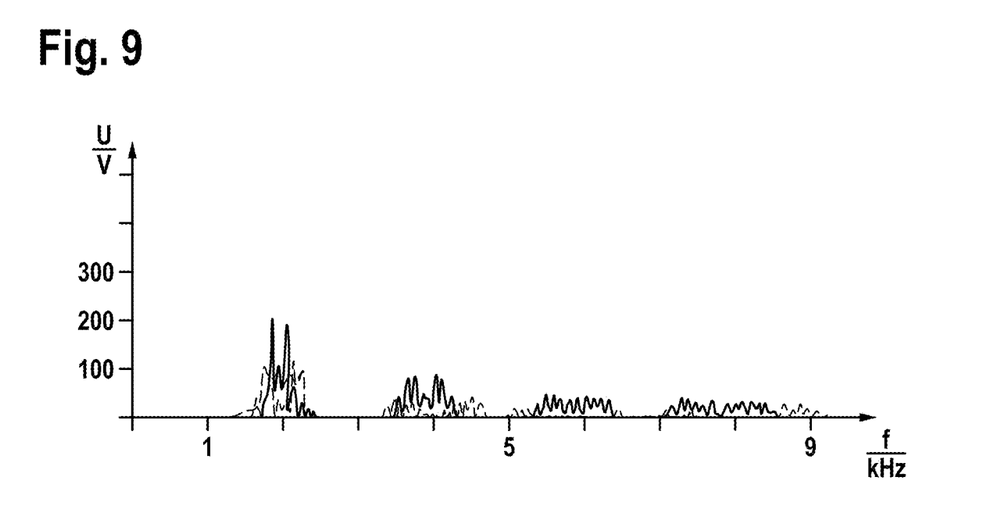
FIG. 9 shows a harmonic spectra for two, or four, switching frequencies.

Further examples for realization with two (unbroken line) and four (broken line) differing switching frequencies are represented in FIG. 9.

Figure 10:
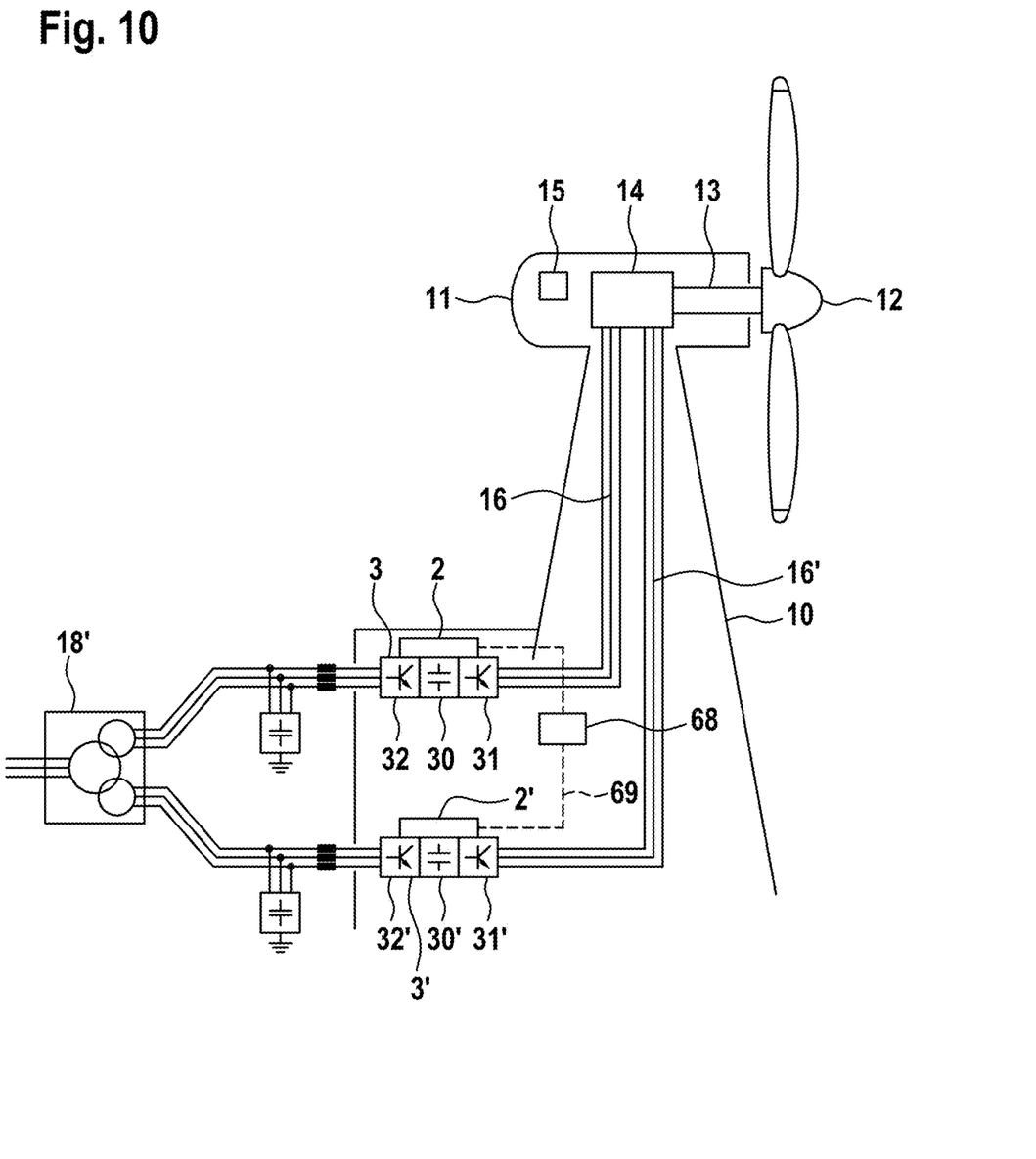
FIG. 10 shows an alternative exemplary embodiment with two converters arranged in parallel.

An alternative exemplary embodiment is represented in FIG. 10. It is based on the exemplary embodiment represented in FIG. 1, and similar components are denoted by the same references. The essential difference consists in that a second converter 3' is provided parallel to the converter 3, having its own line path 16' going out from the generator 14, via the converter 3', as far as the transformer 18', which in this case is realized as a three-winding transformer. The neutral points of the two secondary windings are grounded.

The converter 3' is of a structure corresponding to that of the converter 3, having a generator-side inverter 31', a link circuit 30' and a grid-side inverter 32'. The link circuits 30, 30' are isolated from each other. It has its own converter controller 2', provided for the purpose of control, which is connected to the carrier-signal generator 6 of the converter 3 via a coupling line 69 (see FIG. 2). The second converter 3' is controlled with the same cyclically switched-over switching frequency as the converter 3. However, the carrier signal of the second converter is offset in phase in relation to that of the converter 3, specifically by 180°. This is effected by means of a phase shifter 68, which is looped into the coupling line 69 leading from the output of the carrier-signal generator to the second converter 3'.

The invention claimed is:

1. A method for operating a wind turbine having a generator, which is driven by a wind rotor and which acts in combination with a converter to generate electrical power that is delivered at grid frequency via a connection line, the converter comprising at least one grid-side inverter having current valves, and a converter controller being provided for controlling the converter, the current valves being controlled by a control signal using a switching frequency, the method comprising:
    altering the switching frequency in a step-wise manner between a first integral multiple of the grid frequency and at least one second integral multiple of the grid frequency, the switching frequency being switched over cyclically, and a frequency spacing between switching frequencies being at least double the grid frequency, and none of the switching frequencies being an integral multiple of another of the switching frequencies.

2. The method of claim 1, wherein the integral multiples are odd-number multiples.

3. The method of claim 1, wherein the switchover is effected with a cycle having a periodicity of less than 200 ms.

4. The method of claim 1, wherein the switchover comprises third and fourth switching frequencies that are integral multiples of the grid frequency.

5. The method of claim 4, wherein the third and fourth switching frequencies are odd-number integral multiples.

6. The method of claim 1, wherein all switching frequencies are active for the same time period during a cycle.

7. The method of claim 1, wherein the switching frequencies are active for differing time periods during a cycle.

8. The method of claim 1, wherein at least one second converter is provided, which is arranged parallel to the converter and controlled by a second control signal that is offset in phase in relation to the control signal.

9. The method of claim 8, wherein the phase offset in degrees is selected according to the relationship 360° divided by the number of converters.

10. The method of claim 8, wherein the converters are each respectively connected to the generator via separate lines.

11. The method of claim 1, wherein the switchover is effected with constant phase.

12. The method of claim 11, wherein the switchover is effected in a synchronized manner at a maximum.

13. A wind turbine comprising:
    a converter comprising at least one grid-side inverter having current valves;
    a generator, which is driven by a wind rotor and which acts in combination with the converter to generate electrical power that is delivered at grid frequency via a connection line; and
    a converter controller that is configured for controlling the current valves of the converter by a control signal using a switching frequency, wherein the converter controller is configured for cyclically switching over the switching frequency in a step-wise manner between a first integral multiple of the grid frequency and at least one second integral multiple of the grid frequency, wherein a frequency spacing between the switching frequencies is at least double the grid frequency, and none of the switching frequencies is an integral multiple of another of the switching frequencies.

14. The wind turbine of claim 13, wherein the integral multiples are odd-number multiples.

15. The wind turbine of claim 13, wherein the switchover is effected with a cycle having a periodicity of less than 200 ms.

16. The wind turbine of claim 13, wherein the switchover comprises third and fourth switching frequencies that are integral multiples of the grid frequency.

17. The wind turbine of claim 16, wherein the third and fourth switching frequencies are odd-number integral multiples.

18. The wind turbine of claim 13, wherein all switching frequencies are active for the same time period during a cycle.

19. The wind turbine of claim 13, wherein the switching frequencies are active for differing time periods during a cycle.

20. The wind turbine of claim 13, wherein at least one second converter is provided, which is arranged parallel to the converter and controlled by a second control signal that is offset in phase in relation to the control signal.

21. The wind turbine of claim 13, wherein the converter controller is configured for synchronizing the switchover.

* * * * *